(12) United States Patent
Kim (10) Patent No.: US 11,073,924 B2
(45) Date of Patent: Jul. 27, 2021

(54) APPARATUS OF DISPLAY HAVING DETACHABLE PATTERN

(71) Applicant: Young Su Kim, Suwon-si (KR)

(72) Inventor: Young Su Kim, Suwon-si (KR)

(*) Notice: Subject to any disclaimer, the term of this patent is extended or adjusted under 35 U.S.C. 154(b) by 0 days.

(21) Appl. No.: 16/649,358

(22) PCT Filed: Aug. 27, 2018

(86) PCT No.: PCT/KR2018/009859
§ 371 (c)(1),
(2) Date: Mar. 20, 2020

(87) PCT Pub. No.: WO2019/059546
PCT Pub. Date: Mar. 28, 2019

(65) Prior Publication Data
US 2020/0225781 A1    Jul. 16, 2020

(30) Foreign Application Priority Data

Sep. 23, 2017   (KR) ........................ 10-2017-0123028

(51) Int. Cl.
*G06F 3/041*    (2006.01)
*B32B 7/06*    (2019.01)
(52) U.S. Cl.
CPC ............... *G06F 3/041* (2013.01); *B32B 7/06* (2013.01)
(58) Field of Classification Search
CPC combination set(s) only.
See application file for complete search history.

(56) References Cited

U.S. PATENT DOCUMENTS

| 10,696,011 | B2* | 6/2020 | Kim | G06F 3/041 |
| 2010/0066683 | A1 | 3/2010 | Chang et al. | |
| 2014/0306187 | A1* | 10/2014 | Kim | C08L 51/00 |
| | | | | 257/40 |
| 2015/0060870 | A1* | 3/2015 | Ro | H01L 27/1218 |
| | | | | 257/72 |

(Continued)

FOREIGN PATENT DOCUMENTS

| KR | 20120055454 | 5/2012 |
| KR | 20130003829 | 1/2013 |
| KR | 20150034829 | 4/2015 |

(Continued)

OTHER PUBLICATIONS

International Search Report—PCT/KR2018/009859 dated Nov. 27, 2018.

*Primary Examiner* — Temesghen Ghebretinsae
*Assistant Examiner* — Sosina Abebe
(74) *Attorney, Agent, or Firm* — Cantor Colburn LLP

(57) ABSTRACT

Provided is a display device having an attachable/detachable pattern of which an adhesive force to be attached and detached is freely adjusted and which facilitates removal of bubbles. The display device, having an attachable/detachable pattern, comprising a window and a display and selectively comprising a touch screen includes an attachable/detachable pattern positioned on any one of the window, the touch screen, and the display and having an adhesive force of 0.1 gf/25 mm to 500 gf/25 mm, wherein the attachable/detachable pattern includes an adhesive layer and a curing layer, the adhesive layer occupying an area of 5-95% in the attachable/detachable pattern.

12 Claims, 7 Drawing Sheets

(a)

(b)

(c)

(d)

(56) References Cited

U.S. PATENT DOCUMENTS

2015/0370395 A1* 12/2015 Hsu ................. G06F 3/0412
  345/174
2016/0159052 A1* 6/2016 Kim ................. H05K 5/0017
  361/679.01

FOREIGN PATENT DOCUMENTS

KR          101574923        12/2015
KR          101574923 B1 * 12/2015  ............... B32B 7/12
KR       20160120436        10/2016

* cited by examiner

APPARATUS OF DISPLAY HAVING DETACHABLE PATTERN

CROSS-REFERENCE TO RELATED APPLICATIONS

This application is a national entry of PCT Application No. PCT/KR2018/009859 filed on Aug. 27, 2018, which claims priority to and the benefit of Korean Application No. 10-2017-0123028 filed Sep. 23, 2017, in the Korean Patent Office, the entire contents of which are incorporated herein by reference.

TECHNICAL FIELD

The present invention relates to a display device, and more specifically, to a display device applying a window or a touch screen that can be attached and detached using a detachable pattern including a layer implemented by curing.

BACKGROUND ART

In a display device, a display such as a liquid crystal display (LCD), an organic light emitting diode (OLED), or an electrophoretic display (EPD) forms a screen. Such a display device is applied to various video screen devices. Meanwhile, the device employs a touch screen to provide convenience of handling. A window made of tempered glass or transparent polymer resin is disposed on the front surface of the touch screen. The window is divided into a screen unit at the center and a bezel unit on the rim, and protects the display device from damage caused by external impact or contact. The window is bonded and fixed to the touch screen using an optically clear adhesive (OCA), ultraviolet curable adhesive or the like. Recently, with the advent of flexible and curved displays, windows corresponding thereto are emerging.

Meanwhile, Korean Patent Registration No. 10-1574923 proposes a display device including a detachable window and an attaching and detaching method thereof. Specifically, the patent may easily replace a damaged window, easily separate the window from the display device, simplify the process of manufacturing the display device, reduce manufacturing cost, and design display device in various ways. Similarly, a display device capable of attaching and detaching a touch screen is also possible. By the way, in addition to the features presented in the patent, it needs to reinforce the functions such as adjusting the adhesive force of attaching and detaching the window or facilitating removal of bubbles. This is since that it is needed to set the detachable window or touch screen to meet various usages and environments.

DISCLOSURE OF INVENTION

Technical Problem

Therefore, the present invention has been made in view of the above problems, and it is an object of the present invention to provide a display device having a detachable pattern that can freely control adhesive force of attaching and detaching a window and facilitate removal of bubbles.

Technical Solution

To accomplish the above object, according to one aspect of the present invention, there is provided a display device having a detachable pattern, the device comprising a window and a display, and optionally including a touch screen, in which the detachable pattern is located on any one among the window, the touch screen and the display, has an adhesive force of 0.1 gf/25 mm to 500 gf/25 mm, and includes an adhesive layer and a cured layer, and the area occupied by the adhesive layer is 5 to 95% of the detachable pattern.

In the device according to the present invention, the adhesive layer of the detachable pattern may be cured by heat or ultraviolet rays. The adhesive layer and the cured layer of the detachable pattern may be arranged in the shape of a stripe. The adhesive layer and the cured layer of the detachable pattern are arranged in the shape of a lattice. The adhesive layer and the cured layer of the detachable pattern are arranged to be closed in the shape of a fence. The adhesive layer and the cured layer of the detachable pattern are arranged to form the shape of a fence, to close a part of the fence, and to open a part of the fence. At least one among the strip shape, the lattice shape and the fence shape is a square shape, a wave shape or a combination of these.

In the preferable device according to the present invention, the detachable pattern is attached to and detached from the adhesion reduction layer, and the adhesion reduction layer lowers the adhesive force of the detachable pattern for being attached to and detached from the adhesion reduction layer. All or part of the adhesion reduction layer may include micro protrusions. The adhesion reduction layer may contain fluorine-based resin or silicon-based resin. The adhesion reduction layer may include a deposition layer made of titania ($TiO_2$) or silica ($SiO_2$), and fluorine-based resin or silicon-based resin may be positioned on the deposition layer. Any one among the detachable layer and the adhesion reduction layer may be formed on a touch screen cover layer located on the touch screen.

Advantageous Effects

According to the display device having a detachable pattern of the present invention, as a window structure or a touch screen on which a detachable pattern having an adhesive force of 0.1 gf/25 mm to 500 gf/25 mm is applied to the display device, adhesive force of attaching and detaching a window can be adjusted, and removal of bubbles is facilitated.

DESCRIPTION OF SYMBOLS

100, 200, 300, 400, 500, 600: First to sixth display devices
10: Display 14: Touch screen
16: Adhesion reduction layer 18: Detachable pattern
18a, 18b, 18c, 18d: First to fourth detachable pattern
20: Window
22, 26, 30, 34, 36: First to fifth window structures

BEST MODE FOR CARRYING OUT THE INVENTION

Hereinafter, the preferred embodiments of the present invention will be described in detail, with reference to the accompanying drawings. The embodiments described below may be modified in various other forms, and the scope of the present invention is not limited to the embodiments described below in detail. The embodiments of the present invention are provided to more completely explain the present invention to those skilled in the art. In addition, in the drawings, the thicknesses of films (layers, patterns) and regions may be exaggerated for clarity. In addition, if a film (layer, pattern) is mentioned as being 'above', 'top', 'bottom', 'one side' of another film (layer, pattern), it is formed directly on the other film (layer, pattern), or other films (layers, patterns) may be interposed therebetween.

An embodiment of the present invention proposes a display device for adjusting adhesive force of attaching and detaching a window and facilitating removal of bubbles by applying a window structure or a touch screen formed with a detachable pattern having an adhesive force of 0.1 gf/25 mm to 500 gf/25 mm to the display device. At this point, the window structure or the touch screen has a detachable pattern formed to be attached to and detached from the touch screen or the display. Accordingly, a being-adhered device to be attached and detached may be regarded as being associated with the touch screen or the display. Here, attachment and detachment means freely attaching and detaching the detachable layer to and from the being-adhered device.

The detachable pattern of the present invention may be attached and detached only to and from the touch screen and the display, and is clearly distinguished from a conventional window protection film attached to and detached from the window. That is, a device configured of a display without a window or a touch screen of the present invention is not a display device of a completed form. The display device is completed only when the window or the touch screen of the present invention is attached. By the way, a window protection film is attached on the window of the present invention, and the window protection film is attached to an already completed display. Accordingly, the window or the touch screen of the present invention is an essential component constituting the display device, whereas a conventional window protection film corresponds to an auxiliary component that can be selectively applied to a display device. Accordingly, the window protection film is excluded from the scope of the present invention.

The display device applied to the embodiment of the present invention refers to all image processing devices such as a mobile device, an information processing terminal, a television, and the like. The mobile device may be a cellular phone, a smartphone, a tablet or the like, and the information processing terminal may be an ATM, a kiosk or the like. The display of the display device may be a flat or curved one, or may be a flexible one. The image processing device includes a window, a touch screen and a display. Accordingly, the window generally refers to a window of a mobile devices, a windows of an information processing terminal, and windows of all image processing devices such as a television and the like. Similarly, the touch screen and the display also refer to touch screens and displays applied to all image processing devices.

Hereinafter, a detachable pattern formed on a window structure including a window and a detachable pattern formed on a window structure including a touch screen will be separately described.

The window structure is divided into first to fifth window structures attached to and detached from the touch screen and the display for convenience of explanation. That is, the first to fifth window structures are attached to and detached from the touch screen, the cover layer of the touch screen, and the display (hereinafter, referred to as a being-adhered device). Hereinafter, the first to fifth window structures will be separately described. Although the embodiment of the present invention shows an example of a display device to which the first to fifth window structures are applied, the window structures may be applied to display devices of other types within the scope of the present invention. The window structures of the present invention are separately manufactured and attached to and detached from the being-adhered device. At this point, the window structures may be manually attached.

Hereinafter, it will be described assuming that a detachable pattern is on a window or a touch screen, and an adhesion reduction layer is on a corresponding touch screen or display. However, in some cases, an adhesion reduction layer is on a window or a touch screen, and a detachable pattern may be on a corresponding touch screen or display. Here, the prior case will be described as an example.

<Display Device Applying First Window Structure Attached to and Detached from Touch Screen>

Figure 1:
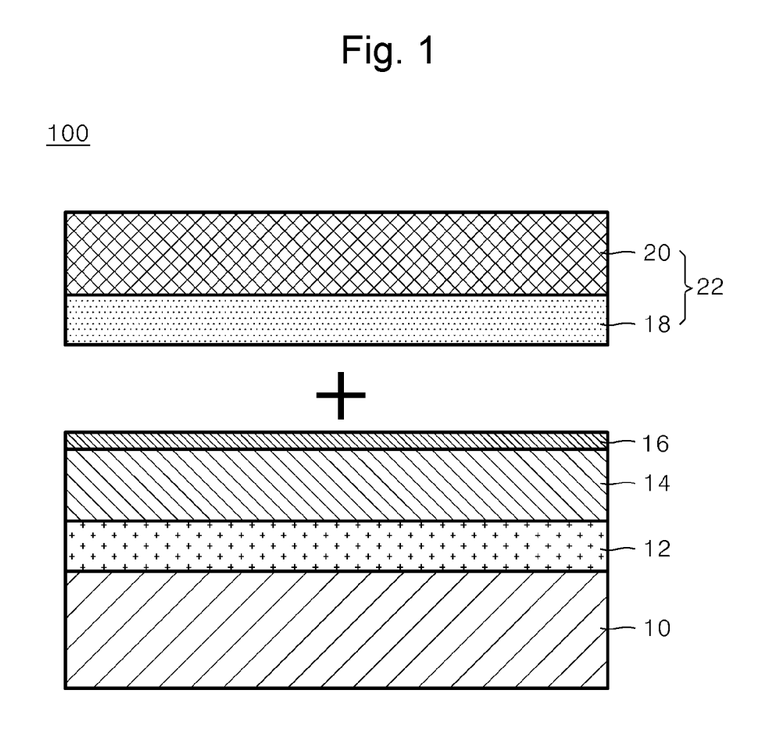
FIG. 1 is a cross-sectional view showing a first display device including a first window structure that can be attached and detached according to the present invention.

FIG. 1 is a cross-sectional view showing a first display device 100 including a first window structure that can be attached and detached according to an embodiment of the present invention. However, it does not show a cross-sectional view of a strict meaning, and there may be components that may not appear in the cross-sectional view for convenience of explanation.

Referring to FIG. 1, the first display device 100 is configured by sequentially stacking a display 10, a bonding layer 12, a touch screen 14, an adhesion reduction layer 16, a detachable pattern 18, and a window 20. At this point, the detachable pattern 18 and the window 20 are referred to as a first window structure 22 together. The display 10 includes a liquid crystal display (LCD), an organic light emitting diode (OLED), an electrophoretic display (EPD) and the like, and quantum dots are also utilized. The bonding layer 12 firmly bonds the touch screen 14 to the display 10. For example, a thermosetting adhesive or an ultraviolet curable adhesive may be used. However, the bonding layer 12 is not limited thereto, and an OCA tape or the like may also be used. The touch screen 14 has a conductive pattern formed on one side or both sides of an insulating layer made of metal oxide or plastic. The metal oxide is mainly applied to the conductive pattern, and the metal oxide includes ITO, ATO, ZnO, Cu, conductive polymer, silver nanowire or the like.

The window 20 may use a transparent material without limit. For example, the window 20 may include a glass substrate or a plastic substrate. Specifically, the glass substrate may be tempered glass, and the plastic substrate may include any one or any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The window 20 may also be a stacked structure in which the tempered glass and the plastic substrate are formed as multiple layers.

The window 20 may have a print layer transparent or implementing various functions. The print layer may apply any one or any one or more coatings among transparent, translucent and color coatings. The print layer may be formed by silk printing, inkjet printing using UV, inkjet printing using thermosetting, or transfer printing. A functional coating layer such as anti-fingerprint coating, antimicrobial coating, or anti-scratch coating may be formed on the window 20. The functional coating layer may be formed by wet coating of applying a coating liquid or dry coating such as deposition. In addition, the characteristics such as shielding, anti-reflection, blue light blocking, electromagnetic wave blocking, privacy and the like may be provided on the bottom of the glass substrate or the plastic substrate of the window 20. In addition, an opening for exposing a button, a camera, a speaker or the like may be formed in the window 20.

Meanwhile, an adhesion reduction layer 16 may be added on the touch screen 14 to facilitate attachment and detachment of the first window structure 22. The adhesion reduction layer 16 increases the slip property by lowering frictional force. The first window structure 22 may be easily attached to and detached from the touch screen 14 by the adhesion reduction layer 16. The adhesion reduction layer 16 may use a coating material of fluorine-based resin or silicon-based resin. The adhesion reduction layer 16 may be formed by depositing titania ($TiO_2$) or silica ($SiO_2$) on the touch screen 14 and then coating a fluorine-based resin or a silicon-based resin on the deposited touch screen 14. At this point, the fluorine-based resin or the silicon-based resin may be formed in an easy cleaning coating (ECC) method. If the adhesion reduction layer 16 is applied, generation of bubbles can be suppressed more effectively when the window 20 is attached. In addition, the adhesion reduction layer 16 allows a consumer to easily attach and detach the first window structure 22 by himself or herself without a tool.

When the adhesive force of the detachable pattern 18 is about 0.1 gf/25 mm to 500 gf/25 mm, the detachable pattern 18 has a self-adhesive force. The self-adhesive force is a property of the detachable pattern 18 adhering itself without bubbles by simply putting the detachable pattern 18 on the touch screen 14. On the other hand, when the adhesion reduction layer 16 is applied to the touch screen 14, the self-adhesive force is improved more than when there is no adhesion reduction layer 16. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment pattern 18 of the same material and thickness is provided, it is easier to attach the first window structure 22 without bubbles. In addition, owing to the effect of the adhesion reduction layer 16, separation of the first window structure 22 occurs relatively easily.

On the other hand, the adhesion reduction layer 16 of the present invention may have micro protrusions formed on all or part of it. The cross section of the micro projection may be angled, curved, or a combination thereof. The adhesion reduction layer 16 having micro protrusions formed thereon has an effect of preventing fingerprint, contamination and reflection by itself, and also has an effect of stably attaching and detaching the detachable pattern 18 without impairing clarity of the screen owing to the micro protrusions.

In addition, the adhesion reduction layer 16 of the present invention may include a pattern formed of micro protrusions. The authenticity and engraved pattern of at least any one product among the window, the touch screen, and the display acquired through different channels can be confirmed. The micro protrusions and the pattern become translucent when they are separated from the detachable pattern 18, and when the detachable pattern 18 is attached to the adhesion reduction layer 16, the micro protrusions and the pattern disappear and the adhesion reduction layer 16 becomes transparent.

Figure 2:
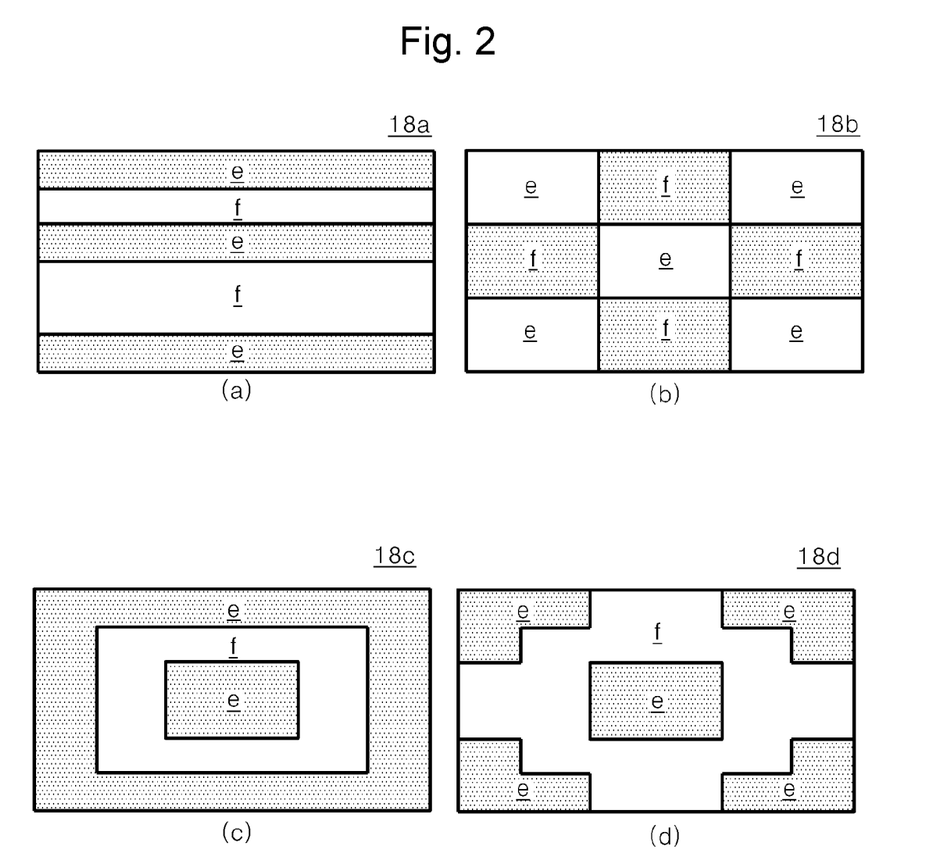
FIG. 2 is plan views showing the examples of a detachable pattern applied to a first window structure that can be attached and detached according to the present invention.

FIG. 2 is plan views showing examples of a detachable pattern 18 applied to a first window structure 22 that can be attached and detached according to an embodiment of the present invention. It merely shows some examples of the detachable pattern 18 herein, and various modifications can be made within the scope of the present invention. In addition, in the drawings, e is an adhesive layer having an adhesive force of about 0.1 gf/25 mm to 500 gf/25 mm, and f is a cured layer formed by curing e and having an adhesive force lower than that of e. That is, e may be referred to as an adhesive layer that can be cured, and f may be referred to as a cured layer. At this point, the area occupied by the cured layer (f) may be 5 to 95% of the adhesive layer (e) and the cured layer (f).

The curable adhesive layer (e) may be a thermosetting adhesive layer or an ultraviolet curable adhesive layer. The thermosetting adhesive layer may be diversely selected within the scope of the present invention. For example, there are an acrylic resin containing a hydroxyl group, an acrylic resin containing a hydroxyl group and having a weight average molecular weight of 100,000 to 1,000,000, a resin composition containing block isocyanate as a main component, a composition containing a hydroxyl group containing acrylic resin and block isocyanate as essential components, a composition containing a compound having two or more functional groups capable of reacting to an isocyanate group in one molecule and a block isocyanate, and the like.

The ultraviolet curable adhesive layer is made by, for example, mixing various acrylic monomers and an ultraviolet curing catalyst with a polyurethane resin, an epoxy resin, or a polyester resin. As a specific example of the curable material by ultraviolet rays, a urethane or acrylate oligomer, a reactive monomer, a photoinitiator and a leveling agent are mixed as the ultraviolet reactive coating material. The urethane acrylate oligomer contains an aliphatic, cyclic aliphatic or aromatic compound or an oligomer of these compounds, and have a chemical formula in which polyester polyols or polyether polyols are contained in the molecular structure. As the reactive monomer, trimethylpropane triacrylate, hexanediol diacrylate, pentaerythritol triacrylate, and dipentaerythritol hexaacrylate are mixed and adjusted in an appropriate ratio considering hardness and adhesive force. The photoinitiator uses a general polymerization initiator activated by ultraviolet rays, and particularly, hydroxycyclohexyl phenyl ketone, benzophenol, and phenyl-2-hydroxy-2-phenyl ketone are mainly used.

In a first detachable pattern 18a(a), curable adhesive layers (e) and cured layers (f) are disposed in the shape of a stripe. The order of disposing the adhesive layers (e) and the cured layers (f) may vary depending on the shape of the first window structure 22 to which the first detachable pattern 18a of the present invention is applied. For example, the cured layers (f) may be mainly disposed in the bezel region. As such, the width of the adhesive layers (e) and the cured layers (f) configuring the first detachable pattern 18a may be appropriately adjusted, respectively. Although the shape of the strip in the drawing is a rectangular shape having a predetermined thickness, in some cases, the shape may be modified to a wave shape or the like.

A second detachable pattern 18b(b) is formed in the shape of a lattice, and an adhesive layer (e) or a cured layer (f) is disposed in each cell. The order of disposing the adhesive layers (e) and the cured layers (f) may vary depending on the shape of the first window structure 22 to which the second detachable pattern 18b of the present invention is applied. For example, the cured layers (f) may be mainly disposed in the bezel region. As such, the areas of the adhesive layers (e) and the cured layers (f) configuring the second detachable pattern 18a may be appropriately adjusted. Although the shape of the strip (→cells) in the drawing is a rectangular shape having a predetermined thickness (→area), in some cases, it may include a shape such as a circle, an ellipse, a wave or the like.

In a third detachable pattern 18c(c), adhesive layers (e) and a cured layer (f) closed in the shape of a fence are disposed. The order of disposing the adhesive layers (e) and the cured layer (f) may vary depending on the shape of the first window structure 22 to which the third detachable pattern 18c of the present invention is applied. For example, the cured layer (f) may be mainly disposed in the bezel region. As such, the areas of the adhesive layers (e) and the cured layer (f) configuring the third detachable pattern 18c may be appropriately adjusted. Although the shape of a fence in the drawing may be a rectangular shape having a predetermined thickness, in some cases, the shape may be modified to a wave shape or the like.

In a fourth detachable pattern 18d(d), one among the adhesive layer (e) and the cured layer (f) passes through some of the closed fence of the third detachable pattern 18c. The order of disposing the adhesive layers (e) and the cured layer (f) may vary depending on the shape of the first window structure 22 to which the fourth detachable pattern 18d of the present invention is applied. For example, the cured layer (f) may be mainly disposed in the bezel region. As such, the areas of the adhesive layers (e) and the cured layer (f) configuring the fourth detachable pattern 18d may be appropriately adjusted. Although the shape of the fence in the drawing may be a rectangular shape having a predetermined thickness, in some cases, the shape may be modified to a wave shape or the like.

The detachable pattern 18 according to an embodiment of the present invention allows to freely adjust adhesive force of attaching and detaching a window. When the areas of the adhesive layers (e) and the cured layers (f) having different adhesive strengths are adjusted, the adhesive force of the detachable pattern 18 is changed. In addition, since the adhesive layers (e) and the cured layers (f) of the detachable pattern 18 are different from each other in the adhesive force, the possibility of removing bubbles increases.

The first window structure 22 of the present invention is separately manufactured and protected by a release film. The release film is removed to attach the first window structure 22 to the adhesion reduction layer 16. When the release film is removed, the detachable pattern 18 is exposed. When the first window structure 22 having the exposed detachable pattern 18 is manually attached to the touch screen 14 or the adhesion reduction layer 16, a display mounted with the window 20 may be completed. In addition, when the window 20 is damaged or to be replaced, the first window structure 22 is manually separated, and a new first window structure 22 may be attached.

Figure 3:
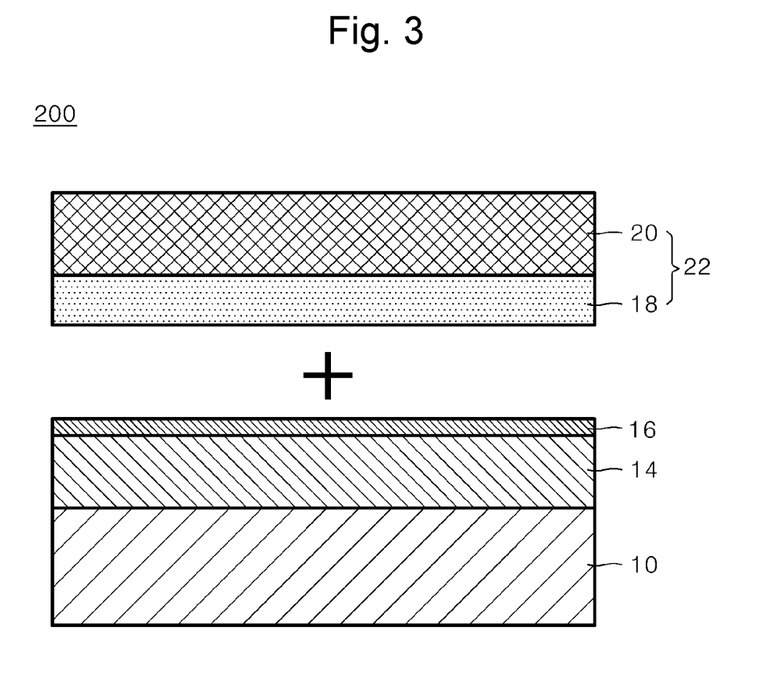
FIG. 3 is a cross-sectional view showing a second display device including a first window structure that can be attached and detached according to the present invention.

FIG. 3 is a cross-sectional view showing a second display device 200 including a first window structure 22 that can be attached and detached according to an embodiment of the present invention. However, it does not show a cross-sectional view of a strict meaning, and there may be components that may not appear in the cross-sectional view for convenience of explanation. At this point, the second display device 200 is the same as the first display device 100 except that the bonding layer 12 does not exist. Hereinafter, the matters overlapped with the above description will be omitted or briefly described.

Referring to FIG. 3, in the second display device 200, a display 10, a touch screen 14, an adhesion reduction layer 16, and a first window structure 22 configure sequential layers. The first window structure 22 includes a detachable pattern 18. The detachable pattern 18 is divided into an adhesive layer (e) that can be cured and a cured layer (f) formed by curing the adhesive layer, and the area occupied by the cured layer (f) may be 5 to 95% of the adhesive layer (e) and the cured layer (f). Adhesive force of the detachable pattern 18 may be adjusted and removal of bubbles may be facilitated by varying the area. Here, the touch screen 14 is manufactured by forming a conductive pattern directly on the display 10. That is, the touch screen 14 is formed together with the conductive pattern formed on the display 10. At this point, the first window structure 22 includes the detachable pattern 18 described above.

The second display device 200 may be provided with an adhesion reduction layer 16, like the first display device 100. The materials, functions and the like of the adhesion reduction layer 16 are the same as those described in the first display device 100. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment pattern 18 of the same material and thickness is provided, it is easy to attach the first window structure 22 without bubbles. In addition, owing to the effect of the adhesion reduction layer 16 (←22), separation of the first window structure 22 occurs relatively easily.

Although not shown in the drawings, an additional component for providing various functions may be further provided between the window 20 and the detachable pattern 18 of the first window structure 22 according to an embodiment of the present invention. The additional component may include an optically clear adhesive (OCA) layer, a shatterproof layer, and the like, and if necessary, a print layer and a functional coating layer may be appropriately formed. For example, after forming an OCA layer including a print layer on the window 20 and attaching a transparent synthetic resin film (e.g., a PET film), the detachable pattern 18 may be formed on the transparent synthetic resin film. Since such an additional component is already well known, detailed description thereof will be omitted.

<Display Device Applying Second Window Structure Attached to and Detached from Touch Screen Cover Layer>

Figure 4:
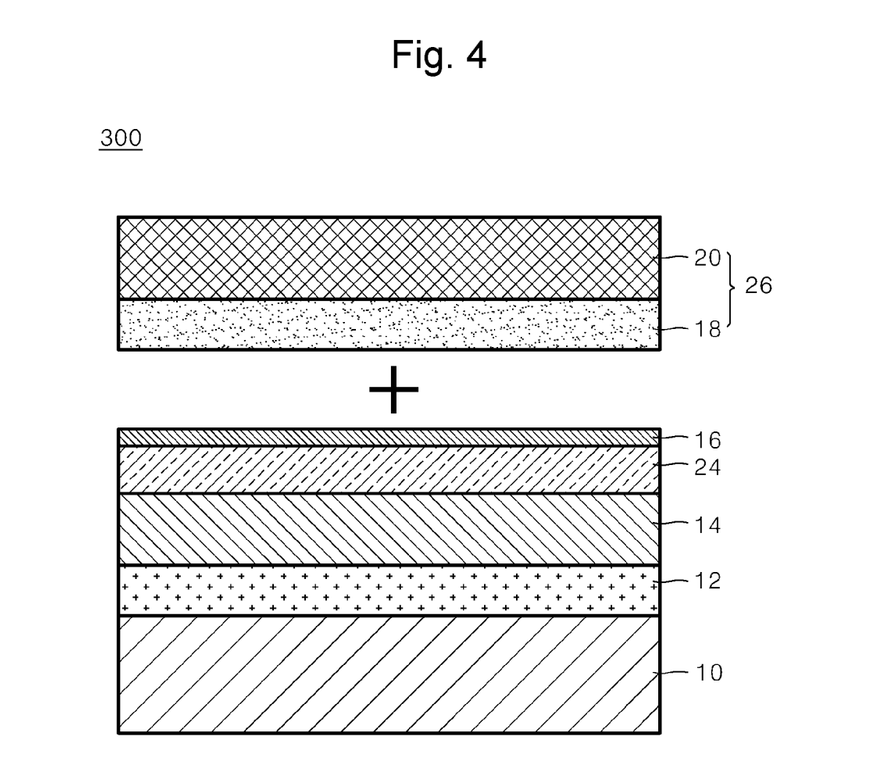
FIG. 4 is a cross-sectional view showing a third display device including a second window structure that can be attached and detached according to the present invention.

FIG. 4 is a cross-sectional view showing a third display device 300 including a second window structure 26 that can be attached and detached according to an embodiment of the present invention. However, it does not show a cross-sectional view of a strict meaning, and there may be components that may not appear in the cross-sectional view for convenience of explanation. At this point, the third display device 300 is the same as the first display device 100 except that a touch screen cover layer 24 is adopted. Accordingly, the detailed description of the same reference numerals will be omitted. At this point, the second window structure 26 may further include additional components, as is described in the first window structure 22.

Referring to FIG. 4, the third display device 300 may be implemented by sequentially stacking a display 10, a bonding layer 12, a touch screen 14, a cover layer 24, an adhesion reduction layer 16, a detachable pattern 18, and a window 20. In some cases, in the third display device 300, the display 10 may be directly bonded to the touch screen 14 without the bonding layer 12, like the second display device 200. The second window structure 26 includes the detachable pattern 18. The detachable pattern 18 is divided into an adhesive layer (e) that can be cured and a cured layer (f) formed by curing the adhesive layer, and the area occupied by the cured layer (f) may be 5 to 95% of the adhesive layer (e) and the cured layer (f). Adhesive force of the detachable pattern 18 may be adjusted and removal of bubbles may be facilitated by varying the area.

Here, a conductive pattern for forming the touch screen 14 is disposed on the top or bottom of the cover layer 24. In a strict sense, the cover layer 24 may be regarded as a part of the touch screen 14. The cover layer 24 prevents the touch screen 14 from being damaged by impact or contamination. In addition, the third display device 300 configures the touch screen 14 by forming a conductive pattern directly on the display 10. In this case, the touch screen cover layer 24 may be positioned on the top of the display 10.

When the cover layer 24 is covered with the second window structure 26, it is positioned inside the third display device 300. Since the cover layer 24 is positioned inside, there is no worry that the cover layer 24 is exposed to the outside of the third display device 300 and damaged by impact or the like. The cover layer 24 may include a print layer or a functional coating layer, and may beautify the third display device 300 through various designs or translucence. In addition, the cover layer 24 may exclude the effect of windings and steps generated by various patterns, circuits or the like of the touch screen 14. When the effect of windings and steps disappears, attachment and detachment by the detachment pattern 18 becomes easier.

The cover layer 24 may use a transparent material without limit. For example, the window 20 may include a glass substrate or a plastic substrate. Specifically, the glass substrate may be tempered glass or untempered glass, and in addition, the plastic substrate may include any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The plastic substrate is further preferable. The thickness of the cover layer 24 is sufficient if the touch screen is not damaged in the process of using the third display device 300.

The third display device 300 may be provided with an adhesion reduction layer 16, like the first display device 100. The materials, functions and the like of the adhesion reduction layer 16 are the same as those described in the first display device 100. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment pattern 18 of the same material and thickness is provided, it is easy to attach the second window structure 26 without bubbles. In addition, owing to the effect of the adhesion reduction layer 16, separation of the second window structure 26 occurs relatively easily.

When the adhesive force of the detachable pattern 18 is about 0.1 gf/25 mm to 500 gf/25 mm, the detachable pattern 18 has a self-adhesive force. The self-adhesive force is a property of the detachable pattern 18 adhering itself without bubbles by simply putting the detachable pattern 18 on the cover layer 24. On the other hand, when the adhesion reduction layer 16 is applied to the cover layer 24, the self-adhesive force is improved more than when there is no adhesion reduction layer 16.

When the window structure is damaged in the display devices according to an embodiment of the present invention, the window structure may be replaced by selecting and attaching a new window structure. Specifically, the broken window structure is removed and replaced by attaching a new window structure. A customer himself or herself may manually perform the process of replacing the window structure, and the time required for replacing the window structure is very short. In addition, since only the window structure needs to be removed, recycle of the display device is easy. Furthermore, since the window structure is attached and detached, it can be easily attached without bubbles. Since a manufacturer only needs to manufacture only the parts other than the window structure and does not need to perform an adhering process, the manufacturing process is simplified.

<Display Device Applying Third Window Structure Attached to and Detached from Display>

Figure 5:
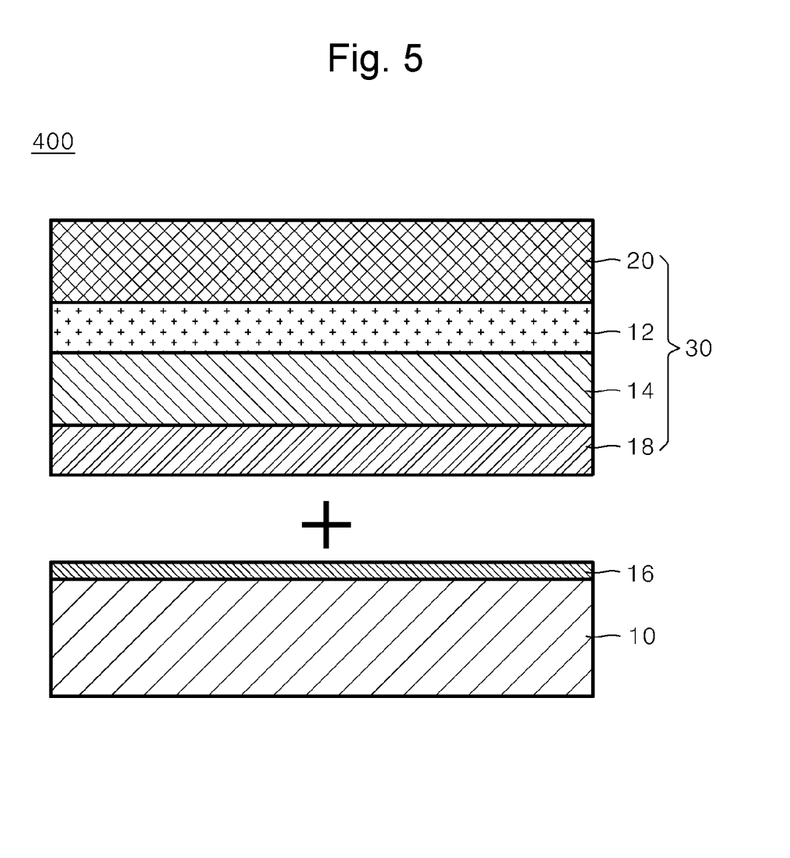
FIG. 5 is a cross-sectional view showing a fourth display device including a third window structure that can be attached and detached according to the present invention.

FIG. 5 is a cross-sectional view showing a fourth display 400 device including a third window structure 30 that can be attached and detached according to an embodiment of the present invention. However, it does not show a cross-sectional view of a strict meaning, and there may be components that may not appear in the cross-sectional view for convenience of explanation. At this point, the fourth display device 400 is basically the same as the first display device 100 except that the position of each layer is changed. Hereinafter, the matters overlapped with the above description will be omitted or briefly described.

Referring to FIG. 5, the fourth display device 400 is configured by sequentially stacking a display 10, an adhesion reduction layer 16, a detachable pattern 18, a touch screen 14, a bonding layer 12, and a window 20. At this point, the window 20, the bonding layer 12, the touch screen 14, and the detachable pattern 18 configure the third window structure 30. The third window structure 30 includes the detachable pattern 18. The detachable pattern 18 is divided into an adhesive layer (e) that can be cured and a cured layer (f) formed by curing the adhesive layer, and the area occupied by the cured layer (f) may be 5 to 95% of the adhesive layer (e) and the cured layer (f). Adhesive force of the detachable pattern 18 may be adjusted and removal of bubbles may be facilitated by varying the area.

The display 10 includes a liquid crystal display (LCD), an organic light emitting diode (OLED), an electrophoretic display (EPD) and the like, and quantum dots are also utilized. For example, a thermosetting adhesive or an ultraviolet curable adhesive may be used for the bonding layer 12. However, the bonding layer 12 is not limited thereto, and an OCA tape or the like may also be used. The touch screen 14 has conductive patterns formed on one side or both sides of an insulating layer made of metal oxide or plastic. Metal oxide is mainly applied to the conductive pattern, and the metal oxide includes ITO, ATO, ZnO, Cu, conductive polymer, silver nanowire or the like.

Meanwhile, an adhesion reduction layer 16 may be added on the display 10 to facilitate attachment and detachment of the third window structure 30. The adhesion reduction layer 16 increases the slip property by increasing the contact angle. The third window structure 30 may be easily attached to and detached from the touch screen 14 by the adhesion reduction layer 16. The adhesion reduction layer 16 may use a coating material of fluorine-based resin or silicon-based resin. The adhesion reduction layer 16 may be formed by depositing titania ($TiO_2$) or silica ($SiO_2$) on the display 10, and then coating a fluorine-based resin or a silicon-based resin on the deposited display 10. At this point, the fluorine-based resin or the silicon-based resin may be formed by easy cleaning coating (ECC) method. If the adhesion reduction layer 16 is applied, generation of bubbles can be suppressed more effectively when the touch screen 14 is attached. In addition, the adhesion reduction layer 16 (←60) allows a consumer to easily attach and detach the third window structure 30 by himself or herself without a tool.

When the adhesive force of the detachable pattern 18 is about 0.1 gf/25 mm to 500 gf/25 mm, the detachable pattern 18 has a self-adhesive force. The self-adhesive force is a property of the detachable pattern 18 adhering itself without bubbles by simply putting the detachable pattern 18 on the touch screen 14. On the other hand, when the adhesion reduction layer 16 is applied to the display 10, the self-adhesive force is improved more than when there is no adhesion reduction layer 16.

The adhesive force according to an embodiment of the present invention may vary depending on the presence of the adhesion reduction layer 16. The adhesive force is 0.5 gf/25 mm to 500 gf/25 mm when the adhesion reduction layer 16 exists. If the adhesion reduction layer 16 does not exist, the adhesive force is 0.1 gf/25 mm to 200 gf/25 mm. If there exists an adhesion reduction layer 16 when a detachment pattern 18 of the same material and thickness is provided, it is easy to attach the third window structure 30 without bubbles. In addition, owing to the effect of the adhesion reduction layer 16, separation of the third window structure 30 occurs relatively easily.

The third window structure 30 of the present invention is separately manufactured and protected by a release film. The release film is removed to attach the third window structure 30 to the display 10. When the release film is removed, the detachable pattern 18 is exposed. When the third window structure 30 having the exposed detachable pattern 18 is manually attached to the display 10, a display mounted with the window 20 may be completed. Accordingly, unlike the prior art, a precise bonding process is not required. In addition, when third window structure 30 is damaged or to be replaced, the third window structure 30 is manually separated, and a new third window structure 30 may be attached.

<Display Device Applying Fourth Window Structure Attached to and Detached from Display>

Figure 6:
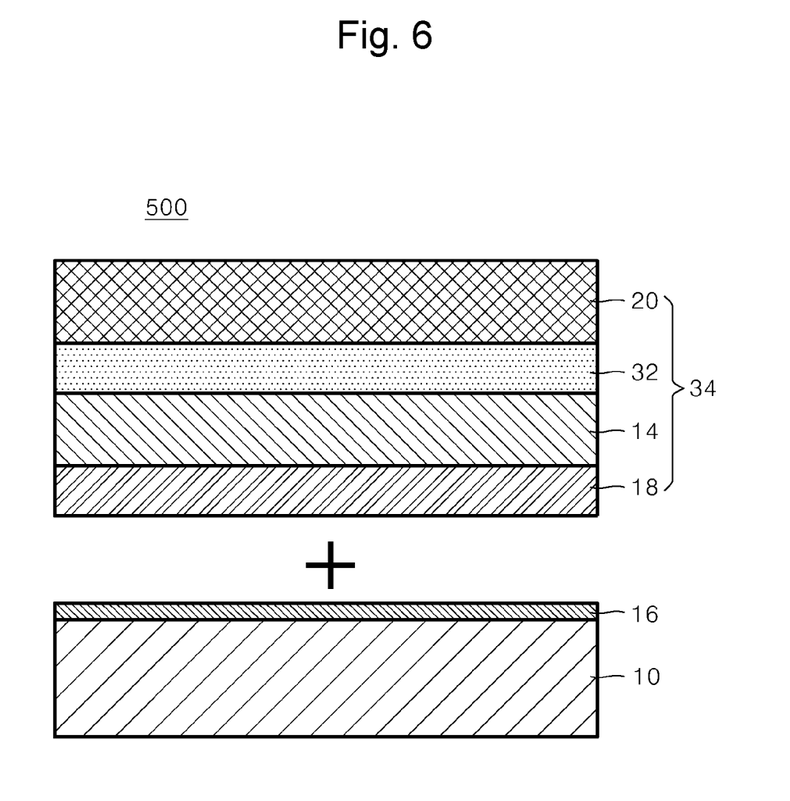
FIG. 6 is a cross-sectional view showing a fifth display device including a fourth window structure that can be attached and detached according to the present invention.

FIG. 6 is a cross-sectional view showing a fifth display device 500 including a fourth window structure 34 that can be attached and detached according to an embodiment of the present invention. However, it does not show a cross-sectional view of a strict meaning, and there may be components that may not appear in the cross-sectional view for convenience of explanation. At this point, the fifth display device 500 is the same as the first display device 100 except that the bonding layer 12 is replaced with a detachable layer 32. Hereinafter, the matters overlapped with the above description will be omitted or briefly described.

Referring to FIG. 6, a display 10, an adhesion reduction layer 16, a detachable pattern 18, a touch screen 14, a detachable layer 32, and a window 20 are sequentially stacked in the fifth display device 500. At this point, the window 20, the detachable layer 32, the touch screen 14, and the detachable pattern 18 configure the fourth window structure 34. The fourth window structure 34 includes the detachable pattern 18. The detachable pattern 18 is divided into an adhesive layer (e) that can be cured and a cured layer (f) formed by curing the adhesive layer, and the area occupied by the cured layer (f) may be 5 to 95% of the adhesive layer (e) and the cured layer (f). Adhesive force of the detachable pattern 18 may be adjusted and removal of bubbles may be facilitated by varying the area.

At this time, although the function and role of the detachable layer 32 are the same, a different reference numeral is assigned since the position is different. The fourth window structure 34 is attached to and detached from the display 10 by the detachable pattern 18. The detachable pattern 18 may be attached to the display 10 while the release film is removed. In addition, the fourth window structure 34 may be attached to and detached from the touch screen 14 by the detachable layer 32. In other words, the fourth window structure 34 includes the detachable pattern 18 and the detachable layer 32 that can be attached to and detached from the display 10 and the touch screen 20 (→14), respectively.

Although any transparent material may be used as the detachable layer 32, it may be an acrylic polymer, a silicon polymer, a urethane polymer, an adhesive made by mixing a crosslinking agent with an ultraviolet curable resin, a mixture thereof, or a copolymer thereof. The detachable layer 32 may be a single layer or a multilayer made of different materials in each layer, and at least one may be a single layer. In the multilayer, a material which forms each layer may be appropriately selected according to the environment in which the detachable layer 32 of the present invention is used. Thickness of the detachable layer 32 is acceptable if the adhesion is sufficient, and thickness of 10 to 200 micrometers is preferable. It is apparent that the thickness can be obtained through repeated experiments by those skilled in the art.

Although not shown in the drawings, an additional component for providing various functions may be further provided between the window 20 and the detachable layer 32 or between the touch screen 14 and the detachable pattern 18 of the third and fourth window structures 30 and 34 according to an embodiment of the present invention. The additional component may include an optically clear adhesive (OCA) layer, a shatterproof layer, and the like, and if necessary, a print layer and a functional coating layer may be appropriately formed. For example, after forming an OCA layer including a print layer on the touch screen 14 and attaching a transparent synthetic resin film (e.g., a PET film), the detachable pattern 18 may be formed on the transparent synthetic resin film. Since such an additional component is already well known, detailed description thereof will be omitted.

<Display Device Applying Fifth Window Structure Attached to and Detached from Display>

Figure 7:
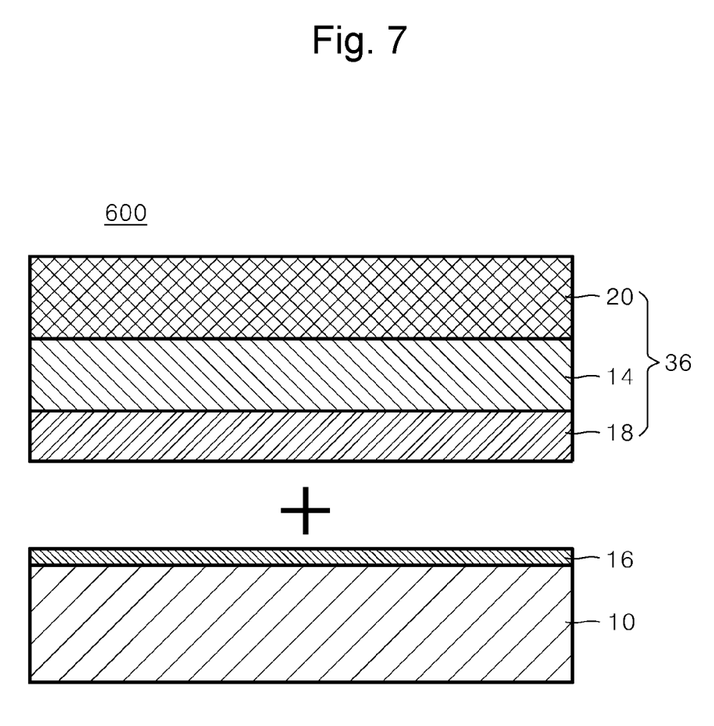
FIG. 7 is a cross-sectional view showing a sixth display device including a fifth window structure that can be attached and detached according to the present invention.

FIG. 7 is a cross-sectional view showing a sixth display device 600 including a fifth window structure 36 that can be attached and detached according to an embodiment of the present invention. However, it does not show a cross-sectional view of a strict meaning, and there may be components that may not appear in the cross-sectional view for convenience of explanation. At this point, the sixth display device 600 is the same as the fourth display device 400 except that the bonding layer 12 is not provided. Accordingly, the detailed description of the same reference numerals will be omitted. At this point, the fifth window structure 36 may further include additional components, as is described in the third window structure 30.

Referring to FIG. 7, the sixth display device 600 is configured by stacking a display 10, an adhesion reduction layer 16, a detachable pattern 18, a touch screen 14, and a window 20. At this point, the window 20, the touch screen 14, and the detachable layer (→pattern) 18 configure the fifth window structure 36. The fifth window structure 36 includes the detachable pattern 18. The detachable pattern 18 is divided into an adhesive layer (e) that can be cured and a cured layer (f) formed by curing the adhesive layer, and the area occupied by the cured layer (f) may be 5 to 95% of the adhesive layer (e) and the cured layer (f). Adhesive force of the detachable pattern 18 may be adjusted and removal of bubbles may be facilitated by varying the area. Here, the touch screen 14 is manufactured by forming a conductive pattern directly under the window 20. That is, the touch screen 14 is formed together with the conductive pattern formed under the window 20.

The sixth display device 600 may be provided with an adhesion reduction layer 16, like the fourth display device 400. The materials, functions and the like of the adhesion reduction layer 16 are the same as those described in the fourth display device 400. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment pattern 18 of the same material and thickness is provided, it is easy to attach the fifth window structure 36 without bubbles. In addition, owing to the effect of the adhesion reduction layer 16, separation of the fifth window structure 36 occurs relatively easily.

When the adhesive force of the detachable pattern 18 is about 0.1 gf/25 mm to 500 gf/25 mm, the detachable pattern 18 has a self-adhesive force. The self-adhesive force is a property of the detachable pattern 18 adhering itself without bubbles by simply putting the detachable pattern 18 on the display 10. On the other hand, when the adhesion reduction layer 16 is applied to the display 10, the self-adhesive force is improved more than when there is no adhesion reduction layer 16.

When the first to fifth window structures 22, 26, 30, 34 and 36 are applied, electrical connection units may be made to face each other in predetermined areas of the display 10 and the touch screen 14, respectively. For the connection units, part of the detachable pattern 18 of the touch screen 14 (→the touch screen 14 and the detachable pattern 18) may be removed. When the first to fifth window structures 22, 26, 30, 34 and 36 are attached to the touch screen 14 and the display 10, the connection units are connected to each other. In this manner, connections of the first to sixth display devices 100, 200, 300, 400, 500 and 600 may be implemented.

When the window structure is damaged in the display devices according to an embodiment of the present invention, the window structure may be replaced by selecting and attaching a new window structure. Specifically, the broken window structure is removed and replaced by attaching a new window structure. A customer himself or herself may perform the process of replacing the window structure, and the time required for replacing the window structure is very short. In addition, since only the window structure needs to be removed, recycle of the display device is easy. Furthermore, since the window structure is attached and detached by adhesion, it can be easily attached without bubbles. Since a manufacturer only needs to manufacture only the parts other than the window structure and does not need to perform an adhering process, the manufacturing process is simplified. Particularly, when an adhesion reduction layer exists, it is easier to attach the window structure without bubbles, and owing to the effect of the adhesion reduction layer, separation of the window structure occurs relatively easily.

The appearance of the display device of the present invention can be diversely designed. The display device of the present invention may be designed to have a beautiful shape, various colors and patterns, and the like. This is since that when an original window structure is separated and a new structure is attached, the appearance of the window structure can be changed in a desired design. Conventionally, it needs to remove adhesion of the window structure and reattach a new window structure to change the design. However, in the display device of the present invention, the design is changed by detaching an existing window structure and attaching a new window structure. Accordingly, unlike a conventional window structure, the window structure of the present invention is not an essential component fixed to a display device and may be treated as a disposable component that can be attached and detached as needed. If the design is diversified in this way, the manufacturer of the display device does not need to provide a service corresponding to the design later.

According to the display device having a detachable pattern of the present invention and a method of manufacturing the same, since a window formed with a detachable pattern having an adhesive force of 0.1 gf/25 mm to 500 gf/25 mm is attached and detached, a damaged window is easily replaced, and separation of the window is simple. If the areas of the adhesive layer (e) and the cured layer (f) of the detachable pattern are changed, the adhesive force of the detachable pattern 18 can be adjusted, and removal of bubbles is facilitated. In addition, since the detachable pattern of the present invention has a self-adhesive force, it can be easily attached and detached without bubbles. Owing to the simple manufacturing process, low manufacturing cost, and diverse designs, the display device of the present invention may satisfy desires of consumers. Furthermore, since anyone may easily replace a window by attaching and detaching, it can be treated as a disposable component rather than an essential component fixed to the display device.

While the present invention has been described above with reference to preferred embodiments, the present invention is not limited to the embodiments described above, and various modifications may be made by those skilled in the art within the scope of the present invention. For example, a separate means such as a groove or the like may be provided in the injection mold of the display device so that the window structure may be attached and detached more easily.

The invention claimed is:

1. A display device having a detachable pattern, the device comprising:
   a display having an adhesive reduction layer formed thereon;
   a window structure having a window and a detachable pattern disposed on the window, the detachable pattern including an adhesive layer and a cured layer, and being detachably attached directly to the adhesive reduction layer; and
   a touch screen disposed between the display and the adhesive reduction layer, or between the window and the detachable pattern,
   wherein an area occupied by the adhesive layer is 5 to 95% of the detachable pattern so that the detachable pattern has an adhesive force of 0.1 gf/25 mm to 500 gf/25 mm depending on the area occupied by the adhesive layer.

2. The device according to claim 1, wherein the adhesive layer is configured to be cured by heat or ultraviolet rays.

3. The device according to claim 1, wherein the adhesive layer and the cured layer are arranged in a shape of a stripe.

4. The device according to claim 1, wherein the adhesive layer and the cured layer are arranged in a shape of a lattice.

5. The device according to claim 1, wherein the adhesive layer and the cured layer are arranged to be closed in a shape of a fence.

6. The device according to claim 1, wherein the adhesive layer and the cured layer are arranged to form a shape of a fence, to close a part of the fence, and to open a part of the fence.

7. The device according to claim 3, wherein the strip shape includes: a square shape, a wave shape or a combination of these.

8. The device according to claim 1, wherein the adhesion reduction layer contains fluorine-based resin or silicon-based resin.

9. The device according to claim 1, wherein the adhesion reduction layer includes: a deposition layer made of titania ($TiO_2$) or silica ($SiO_2$), or a layer containing fluorine-based resin or silicon-based resin on the deposition layer.

10. The device according to claim 1, wherein all or part of the adhesion reduction layer includes micro protrusions.

11. The device according to claim 4, wherein the lattice shape includes: a square shape, a wave shape or a combination of these.

12. The device according to claim 5, wherein the fence shape includes: a square shape, a wave shape or a combination of these.

* * * * *